Aug. 31, 1937.   H. E. MARVEL   2,091,644
DISPENSING APPARATUS
Filed July 7, 1930   2 Sheets-Sheet 1
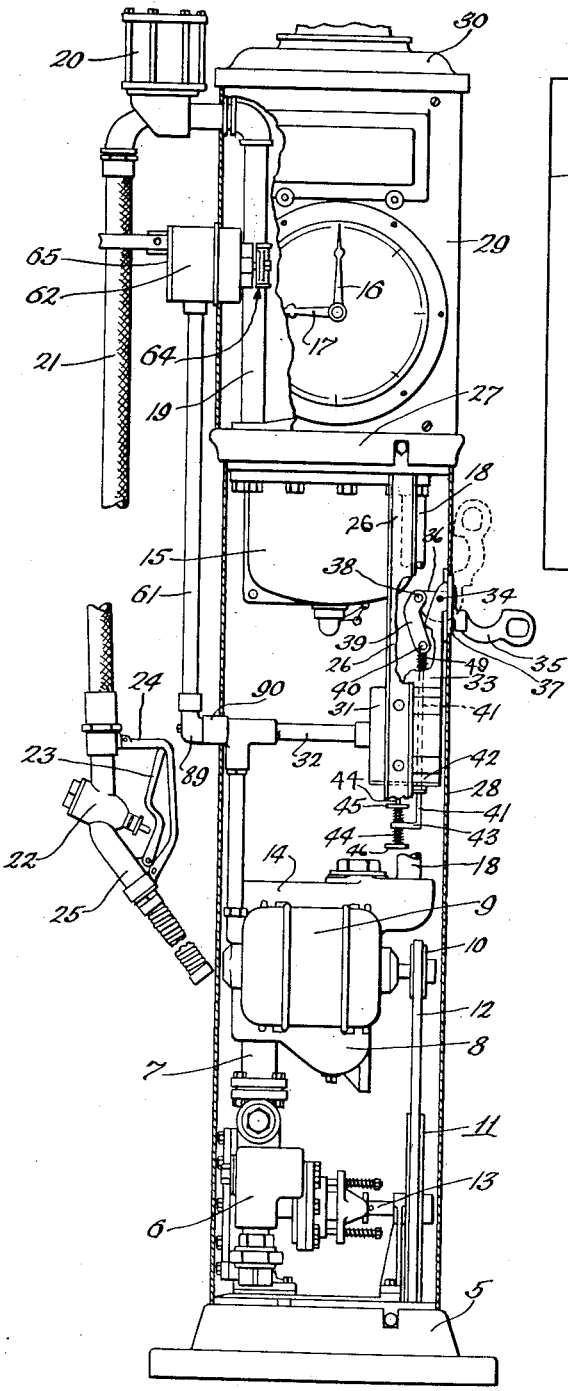
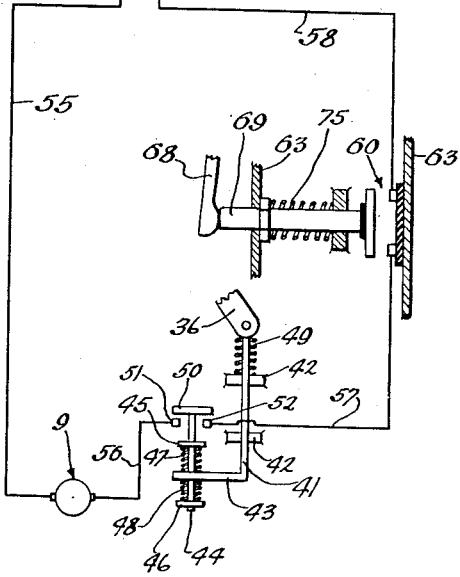
Inventor:
Harvey E. Marvel,
By Chas. M. Nissen,
Atty.

Aug. 31, 1937.　　　　H. E. MARVEL　　　　2,091,644
DISPENSING APPARATUS
Filed July 7, 1930　　　　2 Sheets-Sheet 2
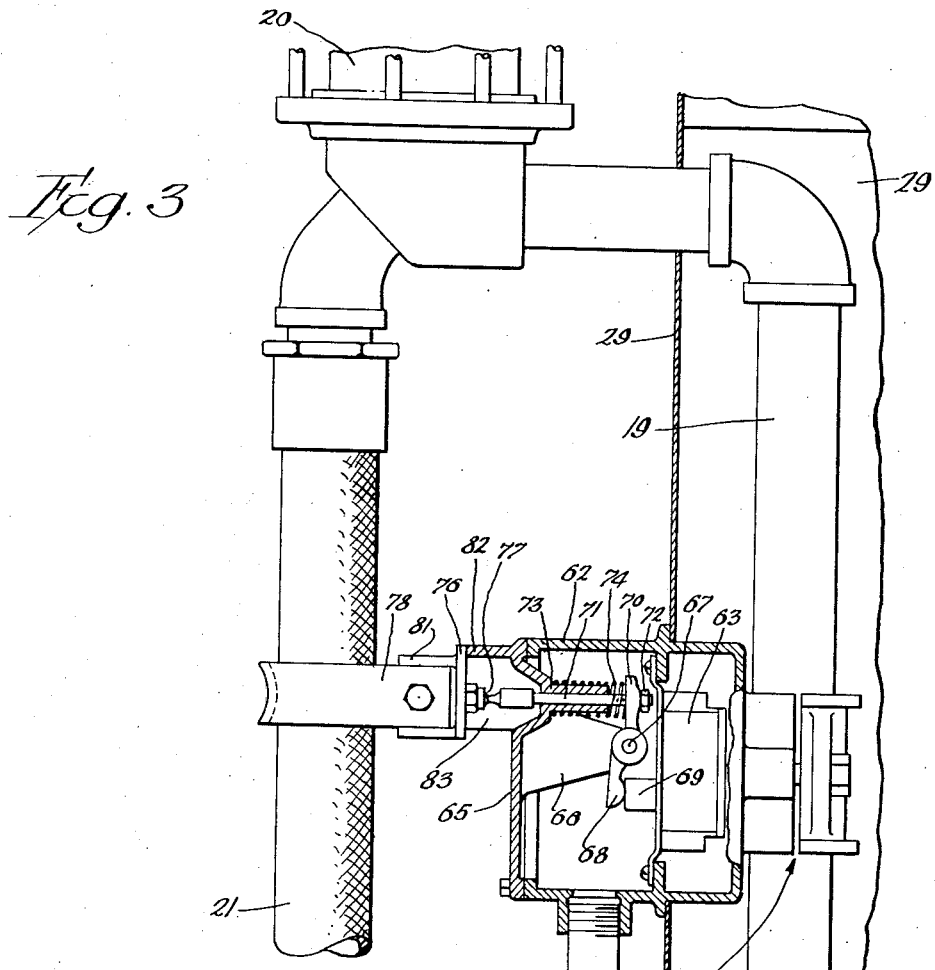
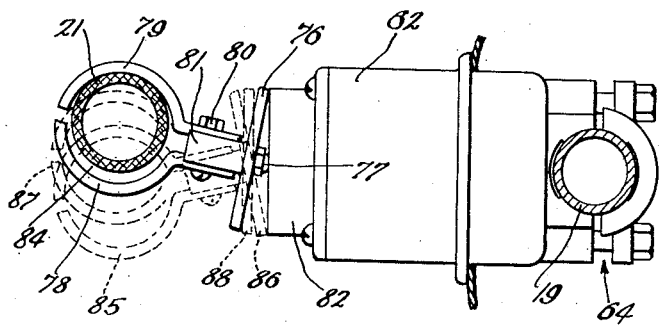
Inventor:
Harvey E. Marvel,
By Chas. M. Nissen,
Atty.

Patented Aug. 31, 1937

2,091,644

UNITED STATES PATENT OFFICE 2,091,644

DISPENSING APPARATUS

Harvey E. Marvel, Fort Wayne, Ind., assignor to S. F. Bowser & Company, Inc., Fort Wayne, Ind., a corporation of Indiana Application July 7, 1930, Serial No. 465,843

16 Claims. (Cl. 221—95)

My invention relates to means for controlling dispensing apparatus and is particularly adapted to dispensing apparatus of the meter type although it may have a general application, one of the objects of the invention being to provide an improved and efficient means for starting and stopping the flow of liquid to be dispensed.

A further object of the invention is the provision of means operable by the swinging of a delivery hose to control the operation of the dispensing mechanism.

More particularly it is the object of the present invention to provide controlling means operable by the swinging of the delivery hose to effect the starting and stopping of the flow of liquid into the delivery hose.

Other objects of the invention will appear hereinafter, the novel features and combinations being set forth in the appended claims.

In the accompanying drawings—

Fig. 1 is an elevational view, partly in section, of a dispensing unit embodying my improvements;

Fig. 2 is a wiring diagram of the electrical circuits and connections;

Fig. 3 is an enlarged elevation, partly in section, of the controller operable by swinging movements of the delivery hose; and Fig. 4 is a plan view, partly in section, of the controller and the parts to which it is connected.

As shown in Fig. 1, the base 5 supports a fluid pressure pump 6 which in turn supports by means of the pipe 7 the bracket 8 on which the electric motor 9 is mounted. The latter is connected by means of the pulleys 10, 11 and belt 12 to the shaft 13 for operating the fluid pressure pump 6.

The pipe 7 which extends upwardly from the pump 6 communicates with the passageway in the air release body 14 which is mounted on the bracket 8. The air release structure is such that it eliminates air which has accumulated in the gasoline or other liquid to be dispensed. However, the air release structure is not shown since it forms no part of the present invention, but is referred to because it is desired that before the gasoline flows through the meter 15 all air shall be excluded therefrom so that only gasoline shall operate the pointer and dial mechanism comprising the pointers 16, 17. That is to say, when gasoline flows upwardly to the pipe 18 (partly broken away in Fig. 1) no air will pass through the meter 15.

It should be understood that mechanism is provided for connection to the meter 15 to operate the pointer and dial mechanism to enable the long pointer 16 to make a complete rotation to indicate a gallon and to enable the short pointer 17 to move over one-twentieth of the face of the dial to indicate a gallon.

From the meter 15 the gasoline flows upwardly through the stationary standpipe 19 which at its upper end is connected to the sight-glass 20. A flexible delivery hose 21 is connected at its upper end to the upper end of the standpipe 19. The free end of the hose 21 is provided with a valve 22 which may be operated by a lever 23 located within the guard 24 attached to the nozzle 25.

A plurality of vertical supports 26, one of which is shown in Fig. 1, may be relied on to support the various parts of the dispensing unit including the upper plate 27 from which the meter 15 is suspended. A housing 28 may enclose the meter 15 and the parts below the same and a housing 29 may be located between the plate 27 and the canopy 30.

Secured to the supporting standard 26 is an electric switch-box 31 to which is secured a conduit 32 for electric wires leading to the electric motor 9.

On top of the switch-box 31 is a bracket plate 33, to the upper end of which at 34 is pivoted the operating lever 35 which when in its full line position shown in Fig. 1 may serve to support the nozzle 25 and the parts associated therewith.

The inner arm 36 of the operating lever is semi-circular on its lower side and is adapted to engage the guide 37 which is mounted in stationary position. The inner end of the arm 36 is pivoted at 38 to the upper end of the link 39, the lower end of which is pivoted at 40 to the vertical rod 41.

The rod 41 is guided through fixed guides including that designated 42. A lower horizontal extension 43 is connected to the lower end of the rod 41 and is provided with a perforation through which extends the vertical switch-rod 44. Secured to this switch-rod are discs 45 and 46 with springs 47 and 48 intervening between these discs and the horizontal arm 43 as shown in Figs. 1 and 2.

When the operating lever 35 is pushed up to its dotted line position shown in Fig. 1, the link 39 will be moved downwardly against the action of the counterbalancing spring 49 and consequently the rod 41 and arm 43 will be pushed down and motion transmitted through the spring 48 and the disc 46 to the rod 44 to lower the switch-plate 50 to connect the contacts 51 and 52. When the operating lever 35 is moved manually back to its full line position shown in Fig. 1, the spring 49 will assure full movement of the lever 35 back to its horizontal position and at the same time assist in moving the rod 41 and arm 43 upwardly to transmit movement through the spring 47 to the disc 45 and rod 44 to the switch-plate 50 to disconnect the latter from the contacts 51 and 52.

When the operator takes the nozzle off the operating lever 35 and pushes the latter up to its dotted line position shown in Fig. 1, the electric switch comprising the plate 50 will be closed and consequently if at this time the main switch 53 is closed, a circuit will be established through the electric motor 9. If the motor is connected to a direct current system of supply the circuit will be from the positive main 54 to one blade of the main line switch 53, conductor 55, motor 9, conductor 56, switch 50, and conductors 57 and 58 to the other blade of the switch 53 to the negative supply main 59. Such would be the circuit established if the electric switch 50 shown in Fig. 2 were omitted. When a circuit through the motor 9 is established the belt and pulley connection 10, 11 and 12 will effect operation of the pump 6 and produce fluid pressure in the flow line and consequently flow of liquid under pressure through the meter 15 and the hose 21 as soon as the nozzle valve 22 is opened by pressing of the lever 23.

In order to turn on and shut off the power of the dispensing mechanism by means of tension exerted on the hose from an operating position at the nozzle end thereof, I have interposed the switch 60 between the conductors 57 and 58 and provided mechanism for closing the switch when the hose is swung or pulled from its vertical position. By means of this arrangement the power for producing pressure in the flow line extending through the meter may be controlled while the dispensing operation is being performed at the nozzle end of the delivery hose by operation of the valve 22. The ease of operation and control is such that when a single operator is at the nozzle end of the delivery hose, for instance while filling the tank of an automobile, he can by pulling the hose from any position where he happens to be, effect the closing of the switch 60 to start the motor 9 and effect the operation of the pump 6. The most convenient way in which the operator may do this is to grasp the nozzle with one hand for manipulating the lever 23 to open the valve 22 whenever flow of gasoline from the nozzle is desired, while grasping the hose a few feet from the nozzle with the other hand to exert tension on the hose to effect closure of the switch 60 and the consequent turning on of the power to produce the desired pressure in the flow line. So long as the operator maintains tension on the delivery hose 21 the power will remain on for dispensing gasoline, but the latter will flow from the nozzle only when the valve 22 is opened by pressure on the lever 23. As soon as the operator releases the tension on the hose or drops the nozzle inadvertently or otherwise, the power is automatically shut off because of the automatic opening of the switch 60. The pump 6 is provided with a bypass so that undue pressure will not be built up in the flow line if the valve at the nozzle remains closed after the power is turned on; it is desirable to increase the efficiency of operation by having the motor 9 operate only when necessary.

The conductors 57 and 58 for the switch 60 may be led through the conduit 61 which is connected at its lower end to the conduit 32 and at its upper end to the housing 62 for the switch-box 63 in which the switch 60 is located. The housing 62 may be clamped as shown at 64 to the vertical standpipe 19 inside of the upper housing 29, or it may have any other suitable and convenient mounting.

The housing 62 is provided on its front side with a detachable cover 65 on the rear side of which is an upright bracket plate 66 to which is pivoted at 67 a switch actuator 68 in position to engage the switch plug 69.

Connected rigidly to the actuator 68 is an arm 70 through which extends a rod 71 with an abutment nut 72 screw-threaded on its outer end as shown in Fig 3. The rod 71 is guided through the slide bearing 73 and a spring 74 surrounds the guide 73 between the back of the cover 65 and the arm 70. The spring 74 therefore urges the arms 70 and 68 to swing in a clockwise direction on the pivot 67 as viewed in Fig. 3 so that the spring 75 shown in Fig. 2 will hold open the switch 60.

A tilting plate 76 is connected by means of a universal joint 77 in the outer end of the sliding rod 71 which as shown is the ordinary type of ball and socket universal joint allowing a turning as well as rocking movement of the plate 76.

Semi-circular lever arms 78 and 79 are bolted at 80 to the tilting plate lever 81.

Horizontal and vertical plates 82 and 83 as shown in Fig. 3, extend forwardly from the upper outer side of the cover 65 to form a protecting canopy for the universal joint 77 and to form in a vertical plane an inverted U-shaped abutment for the upper and lateral edges of the tilting plate 76.

As shown in Fig. 4, the semi-circular arms 78 and 79 are sufficiently spaced apart to permit full freedom of movement of the delivery hose 21 in every direction. The full line positions of the hose 21 and arms 78 and 79 in Fig. 4 show a space or clearance at 84 between the hose 21 and the arm 78. The full line position of the parts illustrated in Fig. 4 shows that the hose has been swung against the arm 79 so as to tilt the plate 76 to its full line position. This results in a pull being exerted on the rod 71 against the action of the spring 74 to move the actuator 68 in an anti-clockwise direction on its pivot 67 as viewed in Fig. 3. The switch-plug 69 will be pushed inwardly against the action of the spring 75 to effect closure of the switch 60. When this occurs the circuit through the motor 9 will be established and consequently the pump 6 will be operated.

The dotted line position 85 of the arm 78 and the dotted line position 86 of the plate 76 indicate the positions of the parts when the hose 21 is swung in the opposite direction. The dotted line position 87 of the arm 78 and the dotted line position 88 of the plate 76 represent the positions of the parts when the hose is swung outwardly directly away from the dispensing unit. When the hose 21 is thus swung directly away from the dispensing unit the plate 76 will be moved entirely out of contact with the inverted U-shaped abutment 82, but when the hose is swung laterally in either direction one vertical edge of the plate 76 will remain in contact with the corresponding vertical edge of the inverted U-shaped abutment 82.

While I have shown two switches 50 and 60, one operated by the operating lever 35 and the other by swinging the hose by exerting a pull thereon while delivering gasoline from the nozzle 25, it should be understood that the switch 50 may in some instances be omitted. Furthermore, the switch 50 may be left in its closed position by leaving the operating lever 35 in its dotted line position and suspending the nozzle elsewhere, for instance, on the elbow pipe 89 at 90 while the upper portion of the hose 21 is suspended in vertical position between the arms 78 and 79 and while the springs 74 and 75 act to hold the switch 60 open. While the switch 50 remains closed the starting and stopping of the pump or the connecting of the power to the flow line may be turned on and off as desired from the nozzle end of the delivery hose by simply exerting sufficient tension thereon to swing the same laterally or outwardly to one of the positions illustrated in Fig. 4.

Obviously those skilled in the art may make various changes in the details and arrangement of parts without departing from the spirit and scope of the invention as defined by the claims hereto appended and I wish therefore not to be restricted to the precise construction herein disclosed. For instance, air operated dispensing mechanism under the control of air valve mechanism may be substituted for the motor 9, pump 6 and switch 60, as the apparatus shown for starting and stopping the power from an operating position at the nozzle is equally adaptable to an air operated dispensing unit.

Having thus fully disclosed an embodiment of my invention, what I desire to secure by letters Patent of the United States is:

1. In dispensing apparatus, the combination with dispensing mechanism comprising a delivery hose, of a controller therefor, an actuator associated with said hose, and a ball and socket joint connecting said actuator and said controller.

2. In dispensing apparatus, the combination with dispensing mechanism comprising a delivery hose, of a controller therefor, a tiltable plate, an abutment for said plate, a universal joint between said plate and said controller, and actuating levers on opposite sides of said hose and secured rigidly to said tiltable plate.

3. In dispensing apparatus, the combination with dispensing mechanism comprising a hose, of a controller therefor, a tiltable plate, an inverted U-shaped abutment for said plate, an actuator connected to said plate and associated with said hose, and a flexible connection between said plate and said controller.

4. In dispensing apparatus, the combination with dispensing mechanism comprising a hose, of a controller, an actuator associated with said hose, an abutment for said actuator, a ball and socket joint connecting said actuator and said controller, and a spring adapted to act through said universal joint to hold said actuator against said abutment while said hose is released.

5. In a dispensing apparatus, in combination with a pump casing having a hose depending therefrom and hanging normally in a vertical position, means for forcing liquid through said hose, and a control member for said forcing means, including devices mounted on said pump casing adjacent the vertically depending hose, said devices including an actuatable member mounted on said casing and a member adapted to be moved by the lateral movement of said hose out of its vertical position, and means forming a universal joint directly connecting said hose-engaging member and the actuatable member, whereby to cause operation of the actuating member on movement of the hose in any lateral direction.

6. In dispensing apparatus, in combination with a pump housing, a delivery hose having a discharge nozzle through which liquid to be dispensed is adapted to be forced, means for forcing liquid through said hose, a control device for said forcing means comprising an actuatable element, a longitudinally slidable rod, resilient means for urging said rod normally in one direction to maintain said actuatable means in predetermined position, and a slidable rod adapted on movement in one direction to operate said actuatable member, spring means for normally urging said slidable rod to a position where it will not operate said actuatable member, said rod having a tiltable plate universally mounted on said rod, a yoke carried by said tiltable plate and embracing said delivery hose whereby on lateral movement of said hose in a plurality of variant directions, said slidable rod will be actuated to control the liquid-forcing means.

7. In dispensing apparatus, in combination with a pump housing, a delivery hose having a discharge nozzle through which liquid to be dispensed is adapted to be forced, means for forcing liquid through said hose, said hose being constructed and arranged normally to hang in a substantially vertical direction, a controlling device for said liquid-forcing means including an actuatable member, a lever pivoted adjacent said actuatable member having an arm adapted to operate the same, said lever having a portion provided with an opening, a bracket on said pump housing, said bracket providing a guide-way, a rod slidable in said guide-way and passing through the opening in said lever portion, and an abutment on the inner end of said rod to engage said lever portion, spring means adapted to push said lever portion in predetermined direction, said rod having a universal mounting on its opposite end, a tiltable bracket mounted on said universal mounting, said bracket adapted in tilted position to abut a stationary member, said universal mounting carrying a member adapted to embrace the hose.

8. In a gasoline pump including an electric motor and a switch mechanism controlling the circuit to said motor, a control for said switch mechanism embodying a hose connection, a rotatable and rockable support for said connection, a lever operative upon said switch mechanism, a member movably connected with said rotatable and rockable support and said lever, and means operative to restore said support, said lever and said member to normal when stresses upon said connections are relieved.

9. In a dispensing apparatus, the combination with dispensing mechanism comprising a delivery hose, of a controller therefor, a tiltable plate, an abutment for said plate, a universal joint between said plate and said controller, and a member rigidly secured to said tiltable plate and adapted to engage said hose whereby to move the plate as the hose is moved.

10. In dispensing apparatus, dispensing mechanism including a movable delivery hose, a controller for said dispensing mechanism, a member universally tiltable and also bodily displaceable without tilting movement, a fixed abutment for said member whereby to cause displacement of the latter as it is tilted in engagement with said abutment, means connecting the member with the controller, and means connecting the member with the hose whereby said member will be tilted or bodily displaced without tilting as the hose is moved.

11. In a dispensing system, a movable conduit for fluid, means for controlling the flow of fluid through the conduit including an electrical control circuit, a nozzle assembly for the conduit, a member adapted to be engaged by the nozzle assembly when not in use, a switch controlled by said member, and a second switch controlled by movement of the conduit, said switches serving to effect the joint control of said control circuit.

12. In a dispensing system, a movable conduit for fluid, means for controlling the flow of fluid through the conduit including an electrical control circuit, a nozzle assembly for the conduit, a member adapted to be engaged by the nozzle assembly when not in use, a switch controlled by said member, and a second switch controlled by movement of the conduit, said switches being arranged in series in said control circuit.

13. In a dispensing system, a movable conduit for fluid, a member operated by movement of the conduit, a control circuit for controlling the flow of fluid through the conduit, a nozzle assembly for the conduit, means adapted to be positioned as an incident to movement of the nozzle asassembly to the position it occupies when not in use, a switch in said control circuit operated by said conduit operated member, and a second switch in said control circuit operated by the means positioned as an incident to movement of the nozzle assembly, said switches serving to effect the joint control of said control circuit.

14. In a dispensing system, a movable conduit for fluid, a member operated by movement of the conduit, a control circuit for controlling the flow of fluid through the conduit, a nozzle assembly for the conduit, a support on which the nozzle assembly may be hung when not in use, means operable as an incident to the placing of the nozzle assembly on the support, a set of connections between the conduit operated member and the control circuit, and an independent set of connections between the control circuit and the means operable as an incident to the placing of the nozzle assembly on the support, said two sets of connections serving to effect the joint control of said control circuit 15. In a dispensing system, a movable conduit for fluid, a member operated by movement of the conduit, a power source for controlling the flow of fluid through the conduit, a nozzle assembly for the conduit, means adapted to be positioned as an incident to the movement of the nozzle assembly to the position said assembly occupies when not in use, a switch for controlling said power source, means for operating said switch from said conduit operated member, and means controlled by the means positioned as an incident to the movement of the nozzle assembly for disabling the control of said power source by operation of said switch.

16. In a dispensing apparatus, the combination with a dispensing mechanism, of means for controlling the operation of said mechanism, a flexible conduit, and connections including a ball and socket joint between said conduit and said controlling means for operating the latter when the conduit is pulled in substantially any direction in which it may be moved.

HARVEY E. MARVEL.